United States Patent Office.

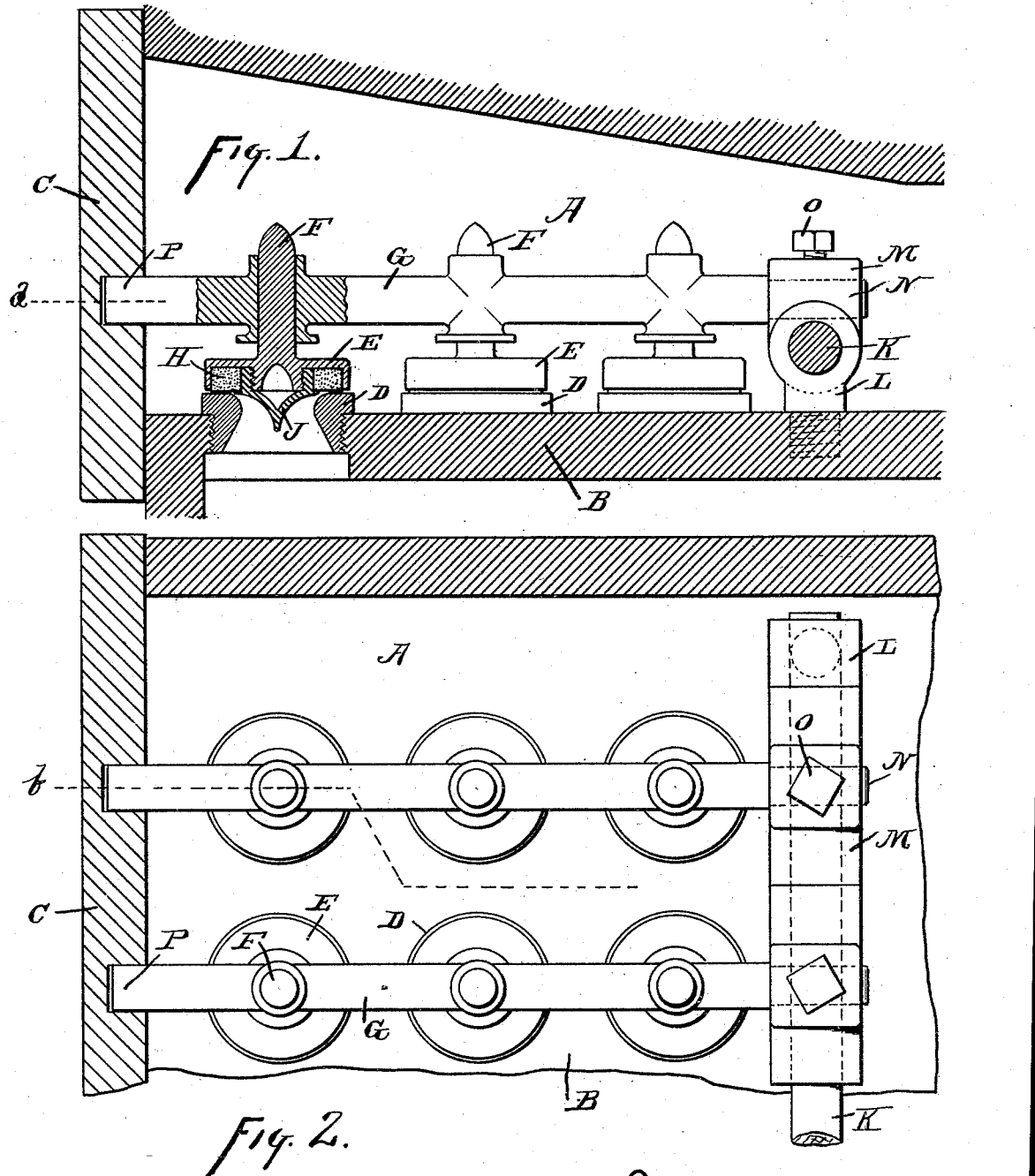

JAMES R. MAXWELL, OF CINCINNATI, OHIO.

VALVE AND VALVE-SUPPORT.

SPECIFICATION forming part of Letters Patent No. 487,408, dated December 6, 1892.

Application filed June 29, 1892. Serial No. 438,481. (No model.)

*To all whom it may concern:*

Be it known that I, JAMES R. MAXWELL, of Cincinnati, Hamilton county, Ohio, have invented certain new and useful Improvements in Valves and Valve-Supports, of which the following is a specification.

This invention pertains to improvements in valves and valve-supports for use in pumping-engines and other situations.

The improvements will be readily understood from the following description, taken in connection with the accompanying drawings, in which—

Figure 1 is a vertical section, in the plane of line $b$ of Fig. 2, of an exemplifying valve-chamber containing valves and valve-supports embodying my present improvements; and Fig. 2, a horizontal section, in the plane of line $a$ of Fig. 1, of a portion of the valve-chamber, showing the valves and valve-supports in plan.

In the drawings, A indicates a valve chamber or chest, which chamber may be taken as representing, for instance, the usual valve-chamber under the pump-cylinder of a horizontal pumping-engine; B, the floor of the chamber forming or holding the valve-seats; C, the usual removable plate or bonnet giving access to the valve-chamber, the usual construction of valve-chamber in horizontal pumping-engines being such that the chamber is open at each side of the pump-cylinder and closed by a bonnet at each side, the drawings showing but one side portion of such valve-chamber; D, the usual valve-seats formed in or attached to the floor of the valve-chamber, the drawings showing these seats in the form of bushings screwed into threaded perforations in the floor of the chamber, as usual; E, the valve-bodies—one for each seat—in the form of cup-shaped disks, the rims of the cups coming over the seats, so that if the cups come down upon the seats they will form valves closing upon the seats; F, the stems of the valves rising centrally from the cups; G, guide-bars, each extending across over a row of the valve-seats and having guiding-eyes for the stems of the appropriate valves; H, annular disks or rings of rubber or analogous material disposed within the valve-cups and having depth sufficient to project below the rims of the cups, so that the rubber disks make contact with the valve-seats, the rims of the cups never touching the seats, except in emergencies, as hereinafter explained; J, a nut screwed upon the lower end of each valve-stem within the cup, each of these nuts having an annular flange engaging under the rubber disk, so that when the nut is screwed home the rubber disk is clamped between such flange and the roof of the cup, the exterior diameter of the flange of the nut being somewhat greater than the diameter of the hole through the valve-seat, so that the nut, if displaced from the cup, cannot pass downwardly through the seat; K, a cylindrical bar mounted upon the floor of the valve-chamber at the inner end of and at right angles to the guide-bars G; L, pockets illustrating means for rigidly supporting the bar K in the valve-chamber; M, bearings journaled upon the bar K—one for each of the guide-bars; N, a journal on the inner end of each guide-bar, each engaging the appropriate one of the bearings M; O, a set-screw in each of the bearings M to serve in clamping the journals N and preventing the rotation of the guide-bars in the bearings, and P the outer ends of the guide-bars rigidly supported in proper relationship to the floor of the valve-chamber, as by projecting into openings in the removable bonnet C.

The valves operate in conjunction with their seats as usual, the rubber disks closing upon the seats, the eyes in the guide-bars furnishing bearings for the valve-stems and limits for the lift of the valves. In case a nut J should become jarred loose and accidentally unscrewed, it cannot pass down through the seat by reason of the flange of the nut being greater in diameter than the hole in the seat. In case the rubber disk becomes loosened by the accidental jarring loose of the nut and in case the rubber is drawn down through the valve seat, the valve is not thereby rendered incapable of performing its office, the rim of the cup in such case making contact with the seat, the valve changing in case of such accident from a rubber-faced valve to a metallic valve.

When the bonnet C is removed, the outer end of any guide-bar may be raised, hinging upon the bar K, thus permitting the withdrawal of the valves from their stem-guides for inspection or renewal. In some cases the valve-chamber may be of such contracted character as not to permit of the proper lifting of the guide-bars. In such case the set-screws O may be loosened and the guide-bars may be turned upon their longitudinal axes, thus putting the valves in position to be readily withdrawn from their stem-guides. The guide-bars are thus seen to be capable of motion upon two axes, one formed by the bar K and the other formed by the journals N, thus fitting the valve-supports for use under most any conditions of valve-chamber.

Under some conditions of valve-chamber construction the axis K will never be utilized and need not be provided for as a hinging-axis, the turning of the guide-bars on their journals N being all that is required, and in other cases, where room in the valve-chamber will permit, the turning of the guide-bars on their journals N will never be utilized and need not be provided for as journals of rotation, the hinging of the guide-bars on the axis K being sufficient.

It is recommended that there be one guide-bar for each row of valves, the guide-bars being placed as close together as the situation of the rows of valves call for, whether the valves be placed in even rows or staggered.

Supporting the bar K by means of the pockets L and supporting the outer ends of the guide-bars by means of the bonnet are to be viewed as mere exemplifications of means for the purpose.

I claim as my invention—

1. The combination, substantially as set forth, of a valve arranged to work in conjunction with a seat, an annular disk, of rubber or analogous material, disposed at the face of the valve and adapted to make contact with the seat, a piece screwing to the valve within the rubber disk and having a flange projecting outwardly under the rubber disk and serving to clamp the rubber disk to the valve, and a seat adapted to have its face engaged by said disk and having its bore-wall projecting inwardly beyond the periphery of said flange below the level of the face of the seat.

2. The combination, substantially as set forth, of a chamber-floor or analogous structure containing a row of valve-seats, a guide-bar extending over said row of seats and carrying a valve-guide over each seat, a valve at each seat, a hinge with its axis at right angles to said guide-bar and uniting one end of said guide-bar articulately to said chamber-floor, and means for holding the other end of said guide-bar in fixed relationship to said chamber-floor.

3. The combination, substantially as set forth, of a chamber-floor or analogous structure containing a row of valve-seats, a valve at each of said seats and provided with stems, a guide-bar disposed over said row of valve-seats and carrying a guide, sockets for each valve, the axes of said sockets intersecting the axis of said bar and provided at one end with a journal parallel with the length of the bar, a bearing supported by said chamber-floor and engaging said journal, a set-screw or equivalent device for preventing the rotation of said guide-bar, and means for holding the other end of the guide-bar in fixed relationship to said chamber-floor.

4. The combination, substantially as set forth, of a chamber-floor or analogous structure containing a row of valve-seats, a valve at each valve-seat, a guide-bar disposed over said row and carrying a guide for each valve and having at one end a journal parallel with the bar, a bearing for said journal, a set-screw or equivalent device for preventing the rotation of the guide-bar, a hinge arranged with its axis at right angles to the guide-bar and serving to unite said bearing articulately to said chamber-floor, and means for holding the other end of said guide-bar in fixed relationship to said chamber-floor.

JAMES R. MAXWELL.

Witnesses:
JAMES W. SEE,
P. P. SHEEHAN.